United States Patent [19]
Cooper et al.

[11] Patent Number: 5,465,167
[45] Date of Patent: Nov. 7, 1995

[54] USING AN IMAGE FROM A FORM IN AUTOMATIC CREATION OF A FORM OR SHEET

[75] Inventors: Martin F. N. Cooper, Fremont; Walter A. L. Johnson, Santa Clara; Z. Erol Smith, III, Palo Alto, all of Calif.

[73] Assignee: Xerox Corporation, Stamford, Conn.

[21] Appl. No.: 855,388

[22] Filed: Mar. 20, 1992

[51] Int. Cl.$^6$ .................................................. H04N 1/32
[52] U.S. Cl. .................... 358/468; 358/402; 358/403; 358/462
[58] Field of Search ......................... 358/468, 440, 358/403, 459, 402, 403, 452, 453, 400; 382/57, 61; 340/734, 721, 716; 379/100

[56] References Cited

U.S. PATENT DOCUMENTS

| | | | |
|---|---|---|---|
| 4,021,777 | 5/1977 | Shepard | 382/61 |
| 4,542,378 | 9/1985 | Suganuma et al. | 340/734 |
| 4,566,127 | 1/1986 | Sekiya et al. | 358/57 |
| 4,588,211 | 5/1986 | Greene | 283/70 |
| 4,634,148 | 1/1987 | Greene | 283/70 |
| 4,811,111 | 3/1989 | Kurokawa | 358/440 |

(List continued on next page.)

FOREIGN PATENT DOCUMENTS

| | | | |
|---|---|---|---|
| 0374892 | 12/1989 | European Pat. Off. | G06F 15/64 |
| 374892A2 | 6/1990 | European Pat. Off. | G06F 15/64 |
| 463471A3 | 1/1992 | European Pat. Off. | G06K 9/20 |
| 62-272751 | 11/1987 | Japan | H04N 1/32 |
| 63-95578 | 4/1988 | Japan | G06F 15/40 |
| 63-242060 | 10/1988 | Japan | H04N 1/21 |
| WO91/01608 | 2/1991 | WIPO | H04N 1/32 |

OTHER PUBLICATIONS

The Complete PC Inc. Title: The Complete Fax/9600 (Chpater 4) 1988.
Suenaga, Y., and Nagura, M., "A Facsimile Based Manuscript Layout and Editing System by Auxiliary Mark Recognition," 5th International Conference on Pattern Recognition Proceedings, Dec. 1–4, 1980, vol. 2, pp. 856–858.
Suenaga, Y., "A Facsimile Based Text Editor Using Handwritten Mark Recognition," IJCAI-79: Proceedings of the Sixth International Joint Conference on Artificial Intelligence, Tokyo, Aug. 20–23, 1979, vol. 2, pp. 856–858.
Kramer, M., "Windows-Based FAx Tools Deliver More than Just the Fax—Cardiff's Teleform Eases Remote Data Entry," PC Week, Mar. 30, 1992, p. 14.
DoveFax Installation and User's Manual, Dove Computer Corporation. Sep. 1990.

*Primary Examiner*—Edward L. Coles, Sr.
*Assistant Examiner*—Madeleine Nguyen

[57] ABSTRACT

A page is automatically created and transmitted in response to data defining set of images. The data define an image showing a form that has been marked; the data also include information indicating an image destination. The page includes a segment that is a version of an image from the marked form. The page can be another form, a cover sheet, or an error sheet, for example. The segment can be a reduced version of the marked form, such as on an error sheet. Or the segment can be a version of the contents of a field in the marked form, such as on a form, a cover sheet, or a listing sheet. The field can be a cover note field, and if the processor determines that the cover note field has been marked, it can automatically create a cover sheet that includes a segment that is a version of an image of the cover note field. The field can be an identifier field. The processor can create a form with a request field that includes a segment that is a version of an image of the identifier field, identifying an item in relation to which an operation can be requested, such as the recipient of facsimile transmission or a document being facsimile transmitted; or the processor can create a cover sheet with a segment that is a version of an image of the identifier field; or the processor can create a listing sheet in which each item's entry includes a segment that is a version of an image of the item's identifier field. The image destination can be indicated by a check mark in a recipient field, by check marks indicating the telephone number of a fax machine, or by data from a transmitting fax machine indicating the fax machine's telephone number.

28 Claims, 8 Drawing Sheets

U.S. PATENT DOCUMENTS

| | | | |
|---|---|---|---|
| 4,893,333 | 1/1990 | Baran et al. | 379/100 |
| 4,933,979 | 6/1990 | Suzuki et al. | 382/61 |
| 4,943,868 | 7/1990 | Yoshinaga et al. | 358/403 |
| 5,060,980 | 10/1991 | Johnson et al. | 283/70 |
| 5,126,858 | 6/1992 | Kurogane et al. | 358/450 |
| 5,153,737 | 10/1992 | Kobayashi | 358/296 |
| 5,167,016 | 11/1992 | Bagley et al. | 395/144 |
| 5,228,100 | 7/1993 | Takeda | 382/61 |
| 5,233,531 | 8/1993 | Schulz | 364/464.02 |
| 5,241,589 | 8/1993 | Jefferson | 379/355 |
| 5,243,437 | 9/1993 | Millman et al. | 358/400 |
| 5,247,591 | 9/1993 | Baran | 382/61 |
| 5,267,047 | 11/1993 | Argenta et al. | 358/400 |
| 5,267,303 | 11/1993 | Johnson et al. | 379/100 |
| 5,282,052 | 1/1994 | Johnson et al. | 358/402 |
| 5,291,305 | 3/1994 | Sakashita et al. | 358/444 |
| 5,363,214 | 11/1994 | Johnson | 358/462 |

USING AN IMAGE FROM A FORM IN AUTOMATIC CREATION OF A FORM OR SHEET

BACKGROUND OF THE INVENTION

The present invention relates to forms from which a system obtains information for use in controlling subsequent operations of the system.

Baran et al., U.S. Pat. No. 4,893,333, describe interactive techniques relating to paper selector sheet forms that a user can mark with a pencil or pen to select and retrieve facsimile pages from a shared facsimile data base FAX server system ("FAX server"). A FAX server unit processes a facsimile signal, interprets the selector sheet, and selects pages desired to be retrieved. FIGS. 2a–2e show various selector sheets; as described at col. 7 lines 5–20, a user may obtain information by transmitting a bar code to the FAX server via a FAX transceiver, and the FAX server decodes the bar code and transmits a copy of stored information to the FAX transceiver. FIG. 2f shows a selector sheet for adding data to the FAX server's stored data base; such a sheet could also be used to remove or modify information in the data base. FIG. 2g, as described at col. 8 line 49-col. 9 line 3, shows a follow-up form that a FAX server might provide to a user at the end of a transmission of data pages via a FAX transceiver. As described at col. 10 lines 42–56, a selector sheet contains a field for the mailing and telephone addresses of an information requestor. This field can be filled in by pencil, pen, or typewriter. The FAX server retains the address field as a separate facsimile based image. Because its area is relatively small, this image may be stored and transmitted at relatively low cost, combined with digital data derived from constrained numbers in bingo fields. A FAX transmission of an information request might consist of a FAX image of the address field plus the interpreted bingo fields.

SUMMARY OF THE INVENTION

One aspect of the invention is based on the discovery of a technique for automatically creating pages during remote interactions with a fax server or other machine that can transmit and receive data defining images. A request can be provided to such a machine by transmitting an image set showing one or more forms, each of which has been marked by a user. The machine can include circuitry for receiving data defining images of the marked forms and for responding to the request.

The technique augments operations available from such a machine. In responding to input image data defining an image set that shows a form, the machine automatically creates a page that includes a segment that is a version of an image from the form. The machine then transmits the automatically created page to a destination indicated by information in the input image data.

The segment can be an image of a field of the form in which the user has marked. For example, the form could include a cover note field; when the cover note field is marked, the machine can include an image of the cover note field in an automatically created cover sheet. Or the form could include an identifier field, such as a field to identify a new recipient or a new document; the machine can include an image of the identifier field in an automatically created cover sheet or listing sheet or in a request field of an automatically created form for requesting facsimile transmission to the recipient or of the document.

The segment can be a reduced image of the form as a whole. For example, the form could request an operation that cannot be performed by the machine. In response, the machine can automatically create an error sheet that includes a reduced image of the form to assist a user in finding the error.

The technique can be extended by creating more than one page, each including a segment that is a version of the same image from the requesting image set. The technique can also be extended by creating a page that includes more than one segment that is a version of an image from the requesting image set. The technique can also be extended by transmitting the automatically created form or sheet to multiple destinations.

The following description, the drawings, and the claims further set forth these and other aspects, objects, features, and advantages of the invention.

DETAILED DESCRIPTION

A. Conceptual Framework

Figure 1:
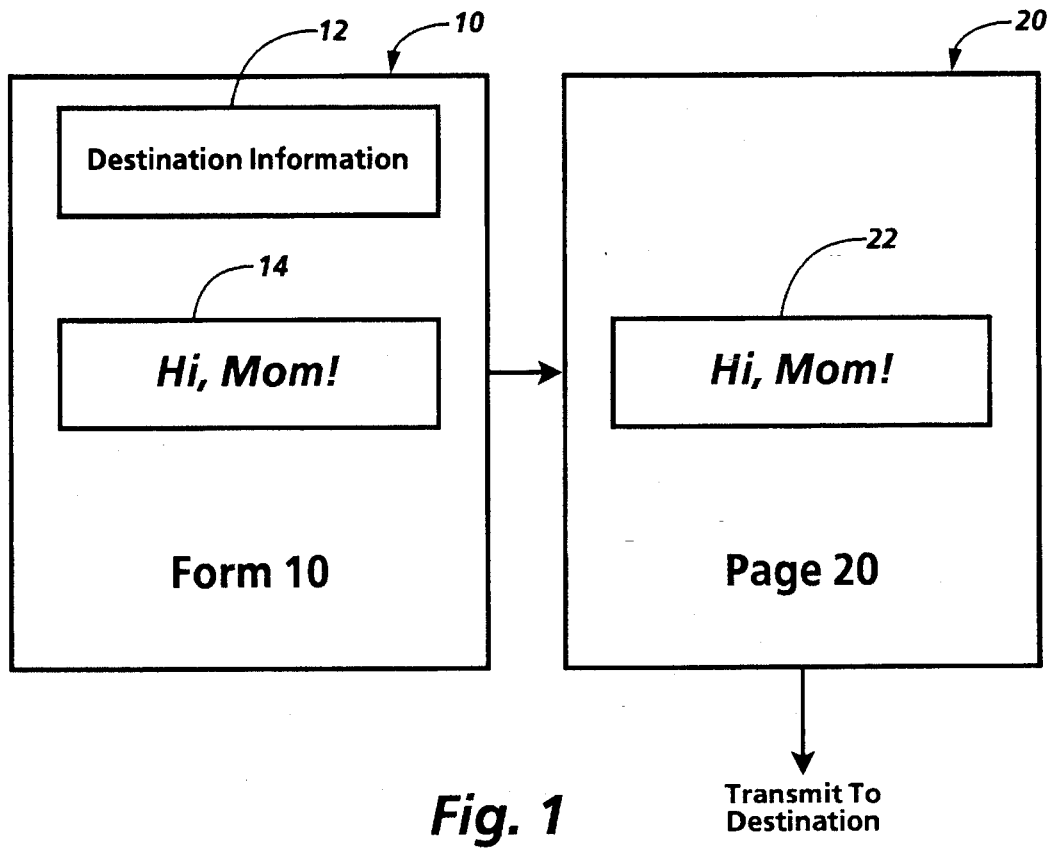
FIG. 1 is a schematic flow diagram showing a form and an automatically created page that includes an image from the form.

The following conceptual framework is helpful in understanding the broad scope of the invention, and the terms defined below have the indicated meanings throughout this application, including the claims.

The term "data" refers herein to signals that indicate or include information. When an item of data can indicate one of a number of possible alternatives, the item of data has one of a number of "values." For example, a binary item of data, also referred to as a "bit," has one of two values, such as "0" and "1" or "ON" and "OFF."

The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any arrangement of matter that can respond to first data at one location or time by providing second data at another location or time.

A "data storage medium" or "storage medium" is a physical medium that can store data. Examples of data storage media include magnetic media such as floppy disks, optical media such as CD-ROMs, and semiconductor media such as semiconductor ROMs and RAMs. As used herein, "storage medium" covers one or more distinct units of a medium that together store a body of data. For example, a set of floppy disks storing a single body of data would be a storage medium.

A "storage medium access device" is a device with circuitry that can access data on a data storage medium. Examples include floppy disk drives and CD-ROM readers.

"Memory" is any component, combination of components, circuitry, or system that can store data, and may include local and remote memory and input/output devices. An example of memory is a storage medium access device with a data storage medium that it can access.

A "data processing system" is a system that processes data. A "data processor" or "processor" is any component or system that can process data, and may include one or more central processing units or other processing components. A processor performs an operation or a function "automatically" when it performs the operation or function independent of concurrent human control.

Any two components are "connected" when there is a combination of circuitry that can transfer data from one of the components to the other.

A processor "accesses" data in memory by any operation that retrieves or modifies the data, such as by reading or writing a location in memory that includes the data. A processor can be "connected for accessing" data by any combination of connections with local or remote memory or input/output devices that permits the processor to access the data.

A processor" uses data in performing an "operation when the result of the operation depends on the value of the data.

An "instruction" is an item of data that a processor can use to determine its own operation. A processor "executes" a set of instructions when it uses the instructions to determine its operations.

An item of data "indicates" an attribute when the item has a value that depends on the existence of the attribute or on a measure of the attribute. For example, an item of data may indicate a set of instructions a processor can execute.

An item of data "includes" information indicating an attribute if data indicating the attribute can be obtained by operating on the item of data.

An "array of data" or "data array" or "array" is a combination of items of data that can be mapped into an array. A "two-dimensional array" is a data array whose items of data can be mapped into an array having two dimensions.

An item of data "defines" an array when it includes information sufficient to obtain or produce the array. For example, an item of data defining an array may include the defined array itself, a compressed or encoded form of the defined array, a pointer to the defined array, a pointer to a part of another array from which the defined array can be obtained, or pointers to a set of smaller arrays from which the defined array can be obtained.

To "obtain" or "produce" an item of data is to perform any combination of operations that begins without the item of data and that results in the item of data. An item of data can be "obtained" or "produced" by any operations that result in the item of data. An item of data can be "obtained from" or "produced from" other items of data by operations that obtain or produce the item of data using the other items of data.

An "image" is a pattern of light. An "image set" is a set of one or more images.

An image may be divided into "segments," each of which is itself an image. A segment of an image may be of any size up to and including the whole image.

An item of data "defines" an image when the item of data includes sufficient information to produce the image. For example, a two-dimensional array can define all or any part of an image, with each item of data in the array providing a value indicating the color of a respective location of the image.

An item of data "defines" an image set when the item of data includes sufficient information to produce all the images in the set.

A "data transmission" is an act that transmits data from one location to another. A "facsimile transmission" is a data transmission in which the transmitted data define an image set according to a standard format. An "image destination" is a machine or other destination to which data defining an image can be transmitted. A "fax machine" is a machine with circuitry that can receive and provide facsimile transmissions. Therefore, the telephone number of a fax machine is an example of information that indicates an image destination.

A processor performs an operation "in relation to" an item when the manner in which the operation is performed is specific to the item. For example, if the operation is facsimile transmission, the item could be a recipient to which the facsimile transmission can be made or the item could be data defining an image set that can be transmitted.

A "marking medium" is a physical medium on which a human can produce a pattern of marks by performing marking actions or actions that modify marks, such as erasing, wiping, or scratching actions. Common examples of marking media include sheets of paper and plastic, although humans can produce patterns of marks on an enormous variety of media. As used herein, "marking medium" covers one or more distinct units of a medium on which, together, a human has produced a pattern of related marks. For example, a set of paper pages that form a handwritten letter would be a single marking medium. Also, as used herein, "marking medium" includes a marking surface of an electronic device that can sense marks.

A user "marks" a marking medium or makes a mark on" a marking medium by performing any action that produces or modifies marks on the marking medium; a user may mark a marking medium, for example, with marking, erasing, wiping, or scratching actions.

The term "mark" includes a single mark and also plural marks that together form a pattern of marks.

The terms "form" and "field" are related: A marking medium may be an instance of a "form," in which case the marking medium has a set of "fields," each of which can be marked in an appropriate way to indicate information. A field may also include information indicating how it should be marked or indicating how a mark in the field is interpreted. For example, a field may include a "check box" indicating a region within which a check-like mark should be made. A field may include one or more fields within it. In addition to its fields, a form can include additional information such as machine-readable or human-readable information identifying the form.

A mark in a field "indicates" an attribute When the presence or shape of the mark depends on the existence of the attribute or on a measure of the attribute. A field is "for indicating" an attribute when one or more appropriate marks in the field would indicate the attribute. A field "indicates" an attribute when one or more marks in the field indicate the attribute.

One type of attribute that can be indicated by a mark in a field is a "request" for an operation, in which case presence of the mark indicates an action by a user intended to cause performance of the operation. For example, the field could include a check box for the mark and could also include information identifying the operation. An operation is performed "in response" to a field when the field is for indicating a request for the operation and a mark in the field indicating a request causes the operation to be performed.

Presence of a mark in a field could also indicate an action by a user intended to indicate an operation without indicating a request for the operation. For example, a mark could indicate an operation of signalling a digit of a telephone number, where signalling the digit is one of a sequence of operations that together perform the operation of obtaining a connection to a fax machine. The mark could be an instance of the digit itself or could be a mark in a check box that indicates the digit. A field "indicates a telephone number" when the marks in the field are sufficient to identify the operations that constitute signalling the telephone number.

An image "shows" a page, such as a page of a form or a sheet, when the image is an image of the page. An image set "shows" a page when the image set includes one or more images that, separately or in combination, show the page. Data "define" a page when the data define an image set that shows the page.

Data define an image that shows a "field that has been marked" or a "field that is marked" or a "field being marked" when the data define an image of the field that includes features that would be interpreted as one or more marks in the field if the defined image were interpreted according to a definition of a form that includes the field. Data define an image set that shows a "form that has been marked" or a "form that is marked" when the data define an image of the form that shows at least one field that has been marked. Therefore, data defining an image set that shows a form that has been marked can be produced in a number of ways: For example, a form on a marking medium can be marked by hand or by typing and then the form can be scanned or facsimile transmitted; or editing software can respond to user actions such as mouse and keyboard clicks by modifying data defining an image of the form so that it includes features that would be interpreted as marks.

An image "shows the contents of" a field that has been marked when the image shows the set of features that would be perceptible as marks in the field if the image were presented to a user.

An image is "from" a form when the image shows a part of the form or the form as a whole. For example, an image showing the contents of a field of a form is "from" the form.

A "version" of a first image is a second image produced using data defining the first image. The second image may be identical to the first image, or it may be modified, such as by reduction or other image processing operations.

An operation "creates" a page, such as a page of a form or a sheet, when the operation produces data defining the page. An operation "transmits" a page when the operation transmits data defining the page.

B. General Features

Figure 2:
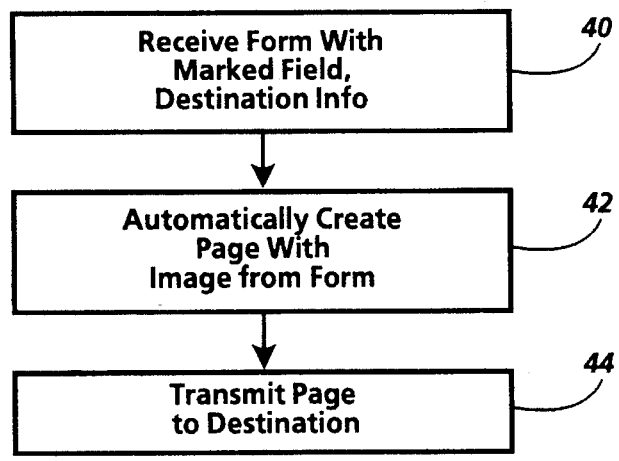
FIG. 2 is a flow chart showing general acts in automatic creation of a page as in FIG. 1.
Figure 3:
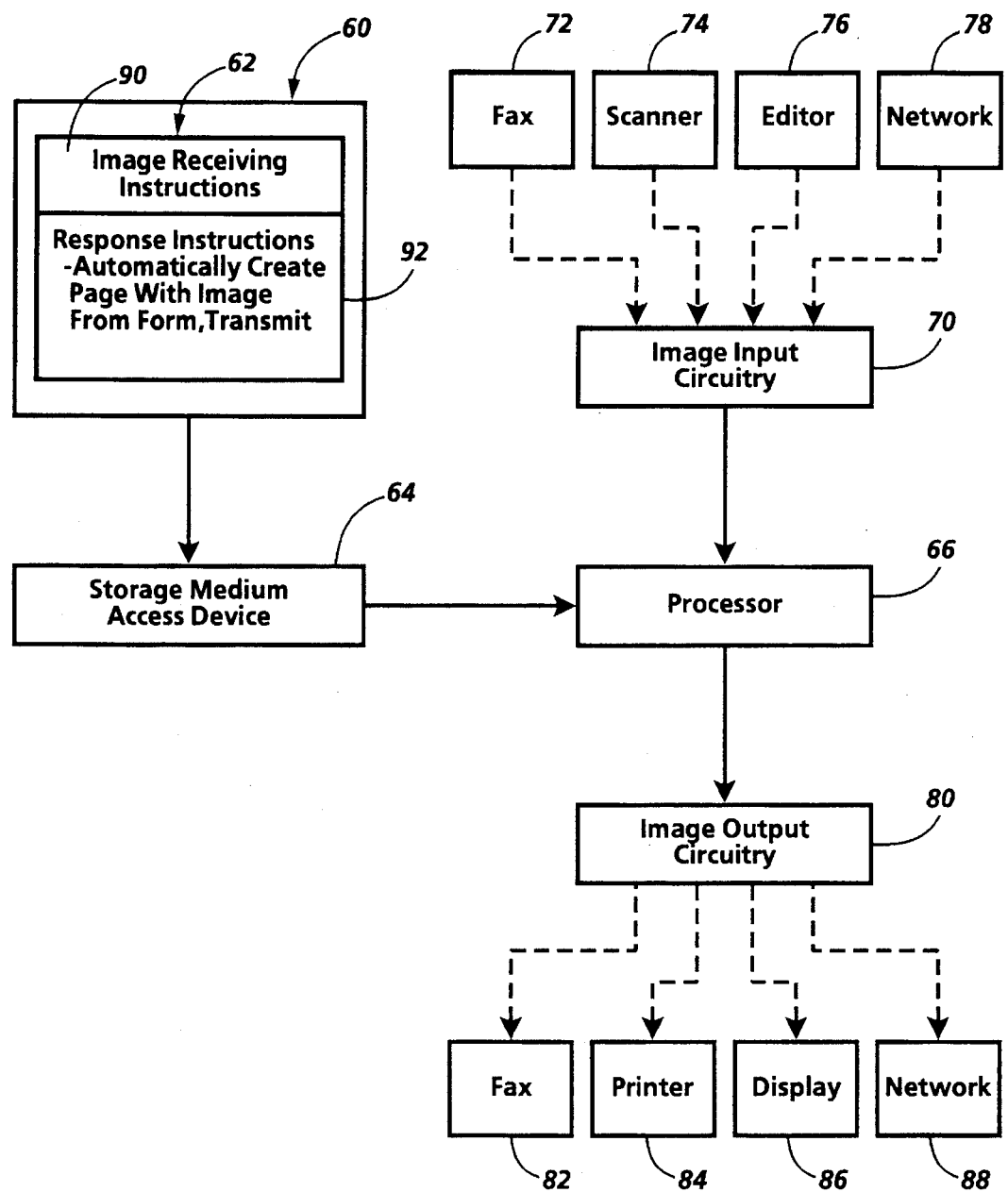
FIG. 3 is a schematic block diagram showing a software product that can be accessed by a system to automatically create a page as in FIG. 2.

FIGS. 1–4D illustrate general features of the invention. FIG. 1 is a schematic flow diagram showing how an image from a form can appear within an automatically created page that is transmitted to a destination indicated in the form. FIG. 2 is a flow chart showing general acts in automatically creating and transmitting a page as in FIG. 1. FIG. 3 is a schematic block diagram showing a software product that can be accessed by a system to automatically create and transmit a page as in FIG. 2. FIGS. 4A to 4D are schematic flow diagrams showing several examples of automatically creating a page and transmitting it.

Form 10 in FIG. 1 includes two fields. Field 12 can be marked to indicate an image destination; for example, field 12 could include check boxes that can be marked to indicate a telephone number of a fax machine or other image destination. Field 14 can be marked with any appropriate marks. As shown, a user has marked field 14 with a simple message.

Page 20, automatically created in response to form 10, includes segment 22, in which appears an image of field 14 from form 10. A processor that automatically creates page 20 can do so based on data defining an image of form 10. Then, the processor can transmit data defining page 20 to the destination indicated in field 12.

The act in box 40 in FIG. 2 receives data defining a first image set that shows a form; the form has a marked field, like form 10 in FIG. 1, and the data includes destination information indicating an image destination. The act in box 42 uses the data defining the image set to automatically produce data defining a second image set that shows a page; the page includes a segment that is an image from the form, like form 20 in FIG. 1. The act in box 44 then transmits the data defining the second image set to the indicated destination.

FIG. 3 shows software product 60, an article of manufacture that can be used in a system that includes components like those shown in FIG. 3. Software product 60 includes data storage medium 62 that can be accessed by storage medium access device 64. Data storage medium 62 could, for example, be a magnetic medium such as a set of one or more floppy disks, an optical medium such as a set of one or more CD-ROMs, or any other appropriate medium for storing data.

Data storage medium 62 stores data that storage medium access device 64 can provide to processor 66. Processor 66 is connected for receiving data defining images from image input ciruitry 70. The data could be obtained from facsimile (fax) machine 72; from scanner 74; from editor 76, which could be a forms editor or other interactive image editor controlled by user input devices such as a keyboard and mouse or a pen- or stylus-based input device; or from network 78, which could be a local area network or other network capable of transmitting data defining an image.

Processor 66 is also connected for providing data defining images to image output circuitry 80. The data could in turn be provided to fax machine 82, to printer 84, to display 86, or to network 88.

In addition to data storage medium 62, software product 60 includes data stored by storage medium 62. The stored data include data indicating image receiving instructions 90, which can be executed to perform the act in box 40 in FIG. 2. The stored data also include data indicating response instructions 92, which can be executed both to create and transmit a page as in boxes 42 and 44 in FIG. 2.

Figure 4A:
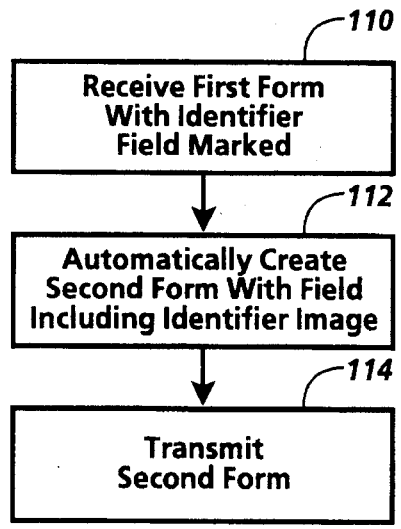
FIG. 4A is a flow chart showing general acts in automatically creating a second form that includes an identifier image from a first form.

In the example of FIG. 4A, the act in box 10 receives data defining a first form that includes an identifier field marked by the user; the identifier field could, for example, provide an identifier for a recipient of facsimile transmission or a document for facsimile transmission. The act in box 112 automatically creates a second form with; a field that includes an image of the identifier field from the first form; for example, the field could include a check box that can be marked to request facsimile transmission in relation to the item identified. The act in box 114 transmits data defining the second form to an image destination indicated in the data defining the first form.

Figure 4B:
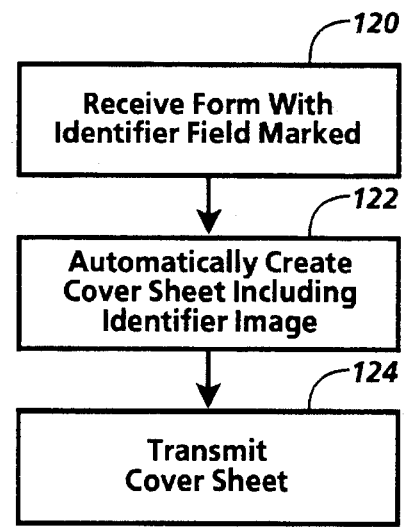
FIG. 4B is a flow chart showing general acts in automatically creating a cover sheet that includes an identifier image from a form.

In the example of FIG. 4B, the act in box 120 receives data defining a form that similarly includes an identifier field marked by the user. The act in box 122 automatically creates a cover sheet .that includes an image of the identifier field from the form. The act in box 124 transmits data defining the cover sheet to an image destination indicated in the data defining the form.

Figure 4C:
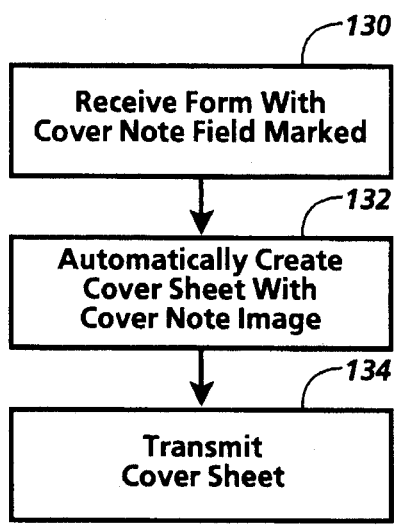
FIG. 4C is a flow chart showing general acts in automatically creating a cover sheet that includes a cover note image from a form.

In the example of FIG. 4C, the act in box 130 receives data defining a form that includes a cover note field marked by the user. The act in box 132 automatically creates a cover sheet that includes an image of the cover note field from the form. The act in box 134 transmits data defining the cover sheet to an image destination indicated in the data defining the form.

Figure 4D:
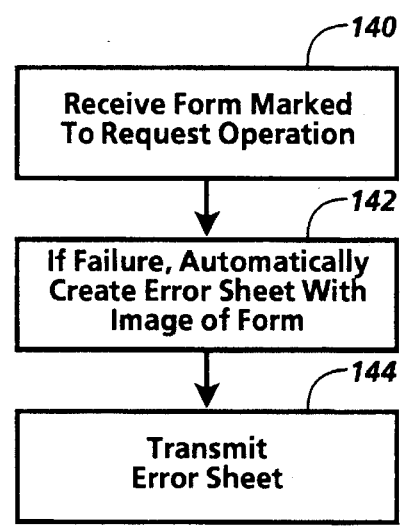
FIG. 4D is a flow chart showing general acts in automatically creating an error sheet that includes an image of a form.

In the example of FIG. 4D, the act in box 40 receives data defining a form that is marked to request an operation. If the operation fails, the act in box 142 automatically creates an error sheet with an image of the form; the error sheet can, for example, include a segment that is a reduced version of the form. The act in box 144 transmits data defining the error sheet to an image destination indicated in the data defining the form.

C. Implementation

The general features described above could be implemented in numerous ways on various machines. A current implementation runs on an IBM PC compatible machine (a "PC") with at least an 80386 microprocessor. The PC is equipped with a "fax card," meaning a combination of a board and software that enables the PC to transmit and receive facsimile images in a standard format, such as CCITT Group 3. The fax card could, for example, be SatisFAXtion™ from Intel Corporation; The Complete Communicator™ or The Complete Fax™ from The Complete PC, Inc.; or proFAX™ from Charter Electronics Industries Pte. Ltd. Because the current implementation is closely linked to a fax card, it is referred to herein as a "fax server."

1. General Fax Server Software Features

Figure 5:
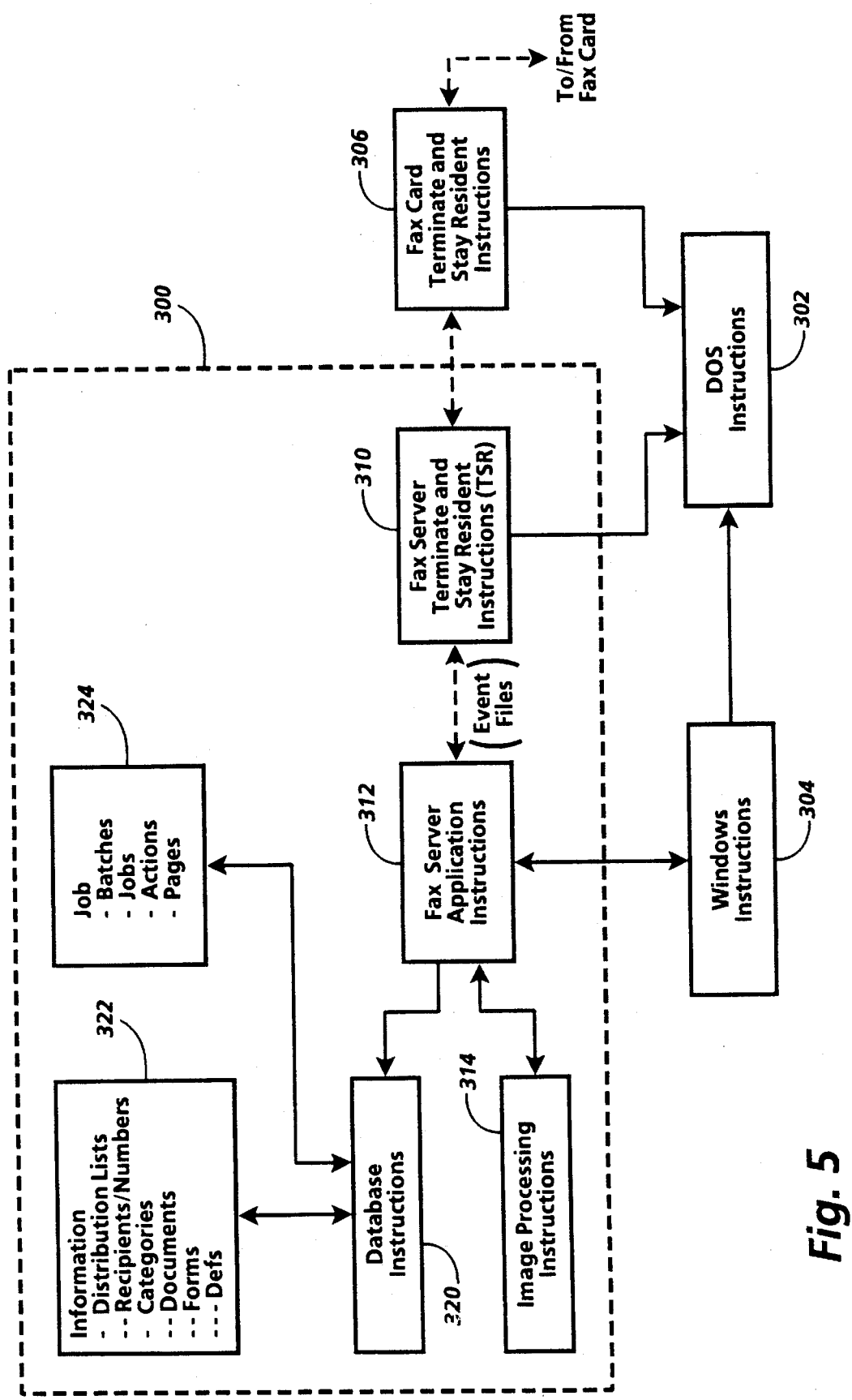
FIG. 5 is a schematic block diagram showing software components of a system that can respond to a form by automatically creating a page that includes an image from the form.
Figure 6:
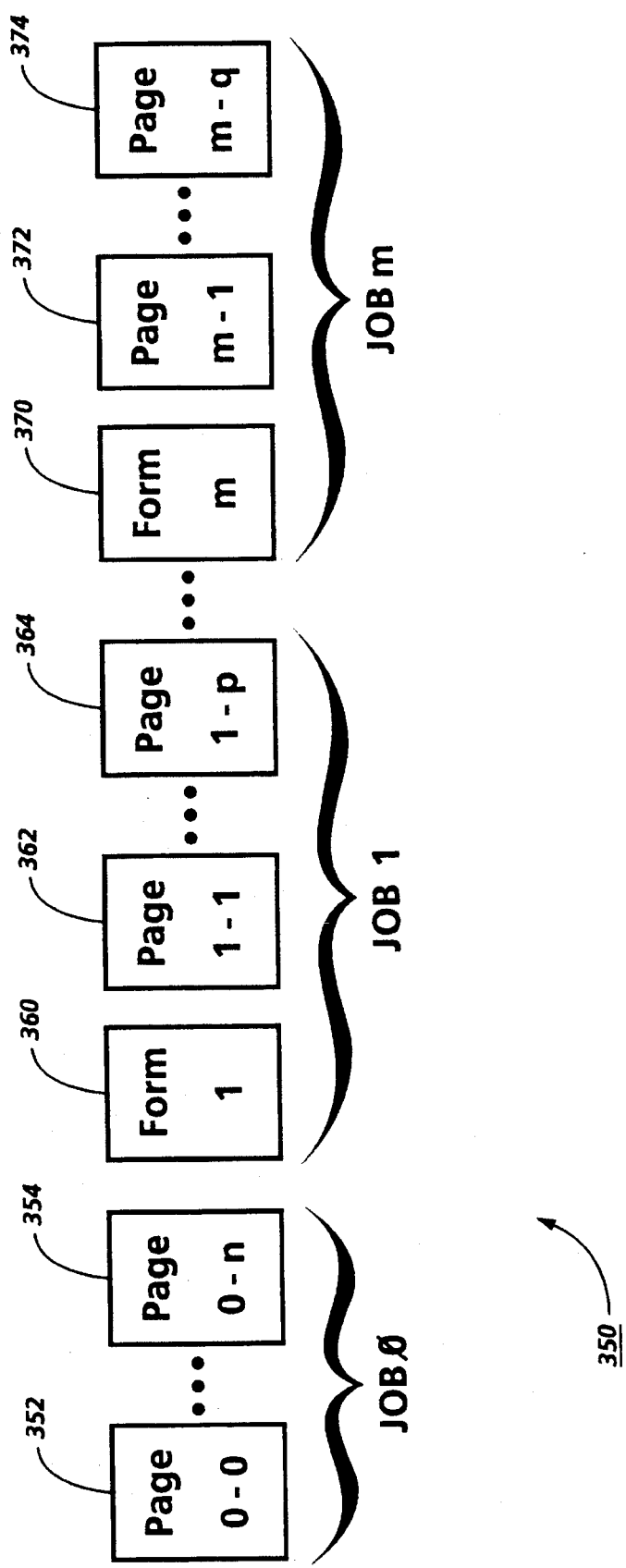
FIG. 6 is a schematic diagram showing a batch that can be handled by the components in FIG. 5.

FIG. 5 shows general software components of the current implementation. FIG. 6 illustrates the organization of a batch that is set up in response to a request from a user.

FIG. 5 shows general software components and some of the communication paths between components. Fax server software 300 includes instructions executed by a processor that is executing DOS instructions 302. In the current implementation, the processor is also executing at least the 3.0 version of Microsoft® Windows™, shown as windows instructions 304.

The communication path between fax server software 300 and the fax card goes through two DOS resident components, fax card terminate and stay resident instructions 306 and fax server terminate and stay resident instructions (TSR) 310.

For most fax cards, fax card terminate and stay resident instructions 306 can be installed when the fax card is installed. For each of these fax cards, fax server software 300 includes a respective TSR 310 that can be loaded when the user installs fax server software 300 in response to a signal from the user indicating the type of fax card.

Some fax cards, such as proFax, have a separate driver for programming. In these cases, the fax card is installed and TSR 310 is loaded during installation of fax server software 300.

Fax card terminate and stay resident instructions 306 and TSR 310 communicate to receive and send facsimile transmissions.

When a facsimile transmission is received,i the fax card automatically stores the received data in a directory in the DOS filing system. When TSR 310 next polls fax card terminate and stay resident instructions 306, TSR 310 receives data indicating that a received ;transmission is in a file in the directory. In response, TSR 310 assigns an event number to the file and creates an event file, The event file includes the event number and other information, such as the DOS file name of the received file and the telephone number of the sending fax machine (or an empty identifier if a telephone number is not available).

When fax server application instructions, 312 next poll TSR 310, TSR responds with the event number of the next unprocessed event file. Fax server application instructions 312 can then handle the received transmission as described below.

Similarly, before fax server application instructions 312 signal TSR 310 to send a facsimile transmission, they create an event file with the next available event number. This event file can include the event number, the telephone number of the destination, a temporary file number identifying a temporary file containing data to be transmitted, and such other information as a user name for a header on transmitted pages, and so forth.

In response to the event file, TSR 310 provides data to fax card terminate and stay resident instructions 306 indicating the destination. TSR 310 can temporarily save the items to be sent in a directory in the DOS filing system. Then fax card terminate and stay resident instructions 306 can put a request on a queue of requests to the fax card. Subsequently, in response to status checks from fax server application instructions 312, TSR 310 can request data from fax card terminate and stay resident instructions 306 indicating whether the items have been successfully sent.

Fax server application instructions 312 perform the central functions of fax server software 300. In addition to the above, fax server application instructions 312 also call image processing instructions 314 to perform image processing operations and database instructions 320 to manage data in information database 322 and job database 324. A user can interact with fax server application instructions 312 through windows instructions 304.

In the current implementation, database instructions 320 include the instructions of db_Vista™, a commercial database product from Raima Corporation. Information database 322 and job database 324 are both implemented using db_Vista.

Information database 322 includes two lists, a list of distribution lists and a list of categories of documents and forms. Each list appears as a top level container within the user interface provided by windows instructions 304, and the user can set up new distribution lists and categories through the user interface. Each distribution list includes information about a set of recipients, including data identifying recipients and telephone numbers of their fax machines; one distribution list, named "All Recipients," includes all of the recipients. Each category of documents and forms includes a set of items, each of which is either a document or a form. For each document, the category includes a pointer to the name of the DOS file in which data defining the document is stored. For each form, the category includes a pointer to the name of the DOS file in which the definition or description of the form is stored.

Job database 324, on the other hand, acts as an automatic scheduler for processing a series of images. Job database 324 therefore includes data indicating any pending batches, jobs, actions, and pages, as described more fully below.

As can be understood from FIG. 5, fax server application instructions 312 can receive requests from a user through the user interface provided by windows instructions 304, based on a display and a user input device such as a keyboard and mouse. In the current implementation, these requests are received as a data structure indicating contents of a form. Fax server application instructions 312 can also receive user requests on forms in facsimile transmissions received by the fax card. Fax server application instructions 312 can respond to a request from either user interface by setting up a batch in job database 324.

FIG. 6 shows batch 350, which includes a series of m jobs, each of which includes data defining one or more images. The images are illustratively pages, such as pages of a facsimile transmission. Job 0 includes n pages, with pages 352 and 354 being the first and last respectively. Job 1 includes p pages, with the first, page 360, defining a form and with pages 362 and 364 being the second and last respectively. Similarly, the following jobs each begin with a form, as illustrated by the last job, with q pages beginning with page 370 defining a form and with pages 372 and 374 being the second and last respectively.

FIG. 6 illustrates several general features in the operation of job database 324 in the current implementation: A batch includes one or more jobs. Each job includes one or more pages. The first job in a batch may not begin with a form, but every job after the first begins with a form which may be followed by a set of pages. Each job thus includes one of the following: a single blank sheet; a number of non-form pages, also referred to as a document; a single form; or a single form followed by a document.

The basic scheduling operation is a cycling operation that, on each cycle, selects an action to be performed from those currently existing in job database 324. The current implementation has a number of different types of actions, many of which may be used to handle a received facsimile transmission. An action of a given type may be "created," meaning that an instance of the type is set up in job database 324.

An action in job database 324 includes various items of information including data indicating the action's function and data that can be used in scheduling performance or execution of the action's function. The scheduling data includes the action's state, whether ready or done; the earliest time to start performing the action's function; a priority to ensure that a retrieve function will be completed before a send function; and, optionally, a special function called a readyproc to determine whether the action is ready for performance of its function.

The Input action is a default action whose function is performed when no other action is ready, based on a readyproc that checks whether other actions are ready. Therefore, job database 324 always includes an Input action. The Input action's function polls TSR 310 to obtain data indicating whether or not a facsimile transmission has been received. If so, the function obtains an event file for the newly received images, sets up a new batch in job database 324, and creates a Batch action.

The Batch action is created by an Input action, as described above. The Batch action's function calls a converter procedure that is appropriate for the fax card being used, as indicated by the user at the time fax server software 300 is installed; the converter procedures convert a received file from the fax card's format to a DOS file in fax server format; the DOS file name can be based on an integer identifier to facilitate communication between windows instructions 304 and TSR 310. Conversion can be performed by calls to modules that can be independently modified and extended. Conversion techniques are described in copending coassigned U.S. patent application Ser. No. 07/856,000, now issued as U.S. Pat. 5,299,018, entitled "A System and Method for Storing Received Facsimile Image Data in Computer Memory," incorporated herein by reference.

The Batch action's function also creates, for each page in the received file, a page entry and a Page action to be performed on that page in job database 324; if only a single page is received, the function includes data in the page entry indicating a single page batch; the; function also creates a Job Set action. The function also creates a Cleanup action.

The Page action is created by a Batch action, as described above. Each Page action has a respective page entry for storing data relating to the respective page.

If the page is a single page batch, the Page action's function calls image processing instructions 314 to determine whether the page is blank. Techniques for detecting a blank page are described in copending coassigned U.S. patent application Ser. No. 07/855,375, entitled "Identification of a Blank Page in an Image Processing System," incorporated herein by reference. If the page is not blank or if the batch has more than one page, the function calls image processing instructions 314 to determine whether the page is a form or a data (non-form) page. Data indicating whether the page is a form or a data page is stored in the page entry; if the page is a form, data identifying the form is also obtained from the image and stored in the page entry.

If every form includes a distinctive registration mark such as a logo, image processing instructions 314 could first search for the logo and determine whether the page is a form using the result of the search. Then, if each form includes machine readable identifying information, the image processing instructions 314 could operate on data defining the image of the form to obtain identifying data identifying the form. Form identifying information could be encoded and included in the image in the manner described in copending coassigned U.S. patent application Ser. Nos. 07/560,514, now continued as 07/931,544, which is now continued as 08/240,798, entitled "Self-clocking Glyph Shape Codes," incorporated herein by reference.

The Job Set action is also created by the Batch action, as described above. The Job Set action has a readyproc that determines that it is ready when there are no pages in the batch whose type remains unknown, meaning that all Page actions for the batch have been completed. In accordance with FIG. 5, a job is created in job database 324 for each job in the batch. Each job is also added to an activity log that lists all jobs, transactions, and transmissions. If a job includes only a single blank sheet, the Job Set action converts an initial form called the "Starter Form," to the fax card format and creates a Retrieve action to transmit the converted Starter Form, as discussed in greater detail below. If a job begins with a form, a Form action is created for the job.

The Form action is created by the Job Set action, as described above. The Form action uses the data identifying the form from the page entry, as stored by the Page action, to access the form's definition from information database 322. The Form action then uses the form's definition to construct calls to image processing instructions 314.

A call to image processing instructions 314 can include data indicating a segment of the form's image, such as a rectangle, or a position within the form's image, such as a corner of a check box. Each call can also include data indicating an operation to be performed; examples include an operation that determines whether a segment has been marked and an operation that clips a segment that has been marked and returns its contents in the form of an array such as a bitmap.

The Form action uses the form's definition and the results returned by image processing instructions 314 to create actions and other items within job database 324. For example, the -form definition can indicate that, if a given check box is marked, a Store action should be created to store a document in response to a Store form; or that a Delete action should be created to delete a document in response to a Delete form; or that a Pre-Send action should be created to prepare to provide a facsimile transmission in response to a Send form; or that a Pre-Retrieve action should be created to prepare to provide a facsimile transmission to a destination indicated on the form or back to the fax machine that sent the form, typically in response to a Retrieve or List Contents form; and so forth.

When the Form action must obtain a destination for a Retrieve action, it begins by using a destination indicated on the form, such as a telephone number of a fax machine. If none is indicated, the Form action uses the telephone number in the current event file, indicating the fax machine from which the Retrieve action was requested. If none, the Form action leaves the destination blank.

As discussed in greater detail below for certain cases, the form's definition can indicate that a new form, a cover sheet, or another image should be automatically created, in which case the Form action obtains data defining the new form, cover sheet, or other image. If a new form is created, it is added to a special category called "All Forms."

The Store action can be created by the Form action, as described above, in response to a Store form that precedes a set of one or more data pages. The Store action obtains a system identifier, such as a file location of the data pages, stores the system identifier in any categories indicated in check boxes on the form and, even if no categories are indicated, stores the system identifier in a special category called "All Documents." The Store action can also associate data defining an identifying image from the Store form with the system identifier in the manner described in copending coassigned U.S. patent application Ser. No. 07/855,987, entitled "Method and System for Labeling a Document for Storage, Manipulation, and Retrieval," incorporated herein by reference.

The Delete action can be created by the Form action, as described above, in response to a Delete form that includes check boxes indicating a set of one or more documents. The Delete action deletes entries in information database 322 for the indicated documents and also deletes the files in which the pages of the documents are stored.

The Pre-Send action can be created by the Form action, as described above, in response to a Send form that includes check boxes indicating a request to provide a facsimile transmission to a set of One or more indicated recipients. The Pre-Send action converts the items to be transmitted, such as forms, cover sheets, and documents, from the fax server's format to the appropriate format for the fax card being used, and stores each converted item in a respective DOS file. Conversion techniques are described in copending coassigned U.S. patent application Ser. No. 07/856,000, now issued as U.S. Pat. No. 5,299,018, entitled "A System and Method for Storing Received Facsimile Image Data in Computer Memory," incorporated herein by reference. For each indicated recipient, the Pre-Send action obtains data indicating a transmission path, such as a fax machine's telephone number.

If the recipient is a new recipient, the Send form includes check boxes indicating the recipient's transmission path;. If the Send form also includes a check box requesting that the recipient be added to the recipient index, the Pre-Send action adds data indicating the recipient's transmission path to indicated distribution lists in information database 322 and, in any event, to a special distribution list called "All Recipients." The Pre-Send action can also associate data defining an identifying image from the Send form with the recipient's transmission path in the manner described in copending, coassigned U.S. patent application Ser. No. 07/855,987, entitled "Method and System for Labeling a Document for Storage, Manipulation, and Retrieval," incorporated herein by reference.

If the recipient is indicated by a check box, the Pre-Send action retrieves the recipient's transmission path data from information database 322. Similarly, if all recipients in a distribution list are indicated by a check box, the Pre-Send action retrieves each recipient's transmission path data.

In either case, the Pre-Send action creates a Send action for each recipient.

The Send action can be created by the Pre-Send action as described above. The Send action orders the DOS files containing items to be transmitted to the specified recipient into a single queue. The Send action submits a request to TSR 310 to send the DOS files in the queue to the specified recipient. The Send action concludes by creating a Verify action.

The Pre-Retrieve action can be created by the Form action, as described above, in response to any request for a facsimile transmission other than a Send form. Like the Pre-Send action, the Pre-Retrieve action converts the items to be transmitted to the appropriate format for the fax card being used, and stores each converted item in a respective DOS file. Then the Pre-Retrieve action creates a Retrieve action.

The Retrieve action can be created by the Pre-Retrieve action as described above. The Retrieve action obtains data indicating a transmission path as obtained by the Form action, either from a return address section on the form or from the data defining the received transmission. If the Form action did not obtain a destination, the Retrieve action fails. The Retrieve action orders the DOS files containing items to be transmitted to the destination into a single queue. The Retrieve action submits a request to TSR 310 to send the DOS files in the queue to the destination. Like the Send action, the Retrieve action creates a Verify action.

The Verify action can be created by the Send action or the Retrieve action, as described above. The Verify action submits a request to TSR 310 for data indicating the status of the facsimile transmission that resulted from the Send action or Retrieve action that created the Verify action. If the facsimile transmission has not yet completed, the Verify action resets its start time so that it will be performed again later. The fax card will redial according to its configuration, and if the fax card reports a failure, the Verify action reports the failure to the activity log before completing.

The Cleanup action can be created by the Batch action as described above. The Cleanup action has a readyproc that determines that it is ready to be performed only when all other actions associated with the Batch action that created it are completed. The Cleanup action deletes any temporary files created by the other actions associated with the Batch action.

Each cycle of the basic scheduling operation selects an appropriate action to be performed next. For example, if the only actions that are ready are a Batch action and its Cleanup action, the Batch action is selected and performed.

In addition to selecting an action to be performed next, each cycle of the basic scheduling operation branches based on whether a user interface action is waiting from the user interface provided by windows instructions 304. If so, a waiting user interface action is performed.

It would be straightforward to extend the current implementation to handle forms that request more than one type of operation or to handle a special form indicating a new recipient but not requesting a Send action. Similarly, it would be straightforward to extend the current implementation so that all the facsimile transmissions to a single destination from a single batch would be combined into a single continuous transmission rather than being transmitted independently.

2. Automatic Page Creation-Image Segment from Form

Figure 7:
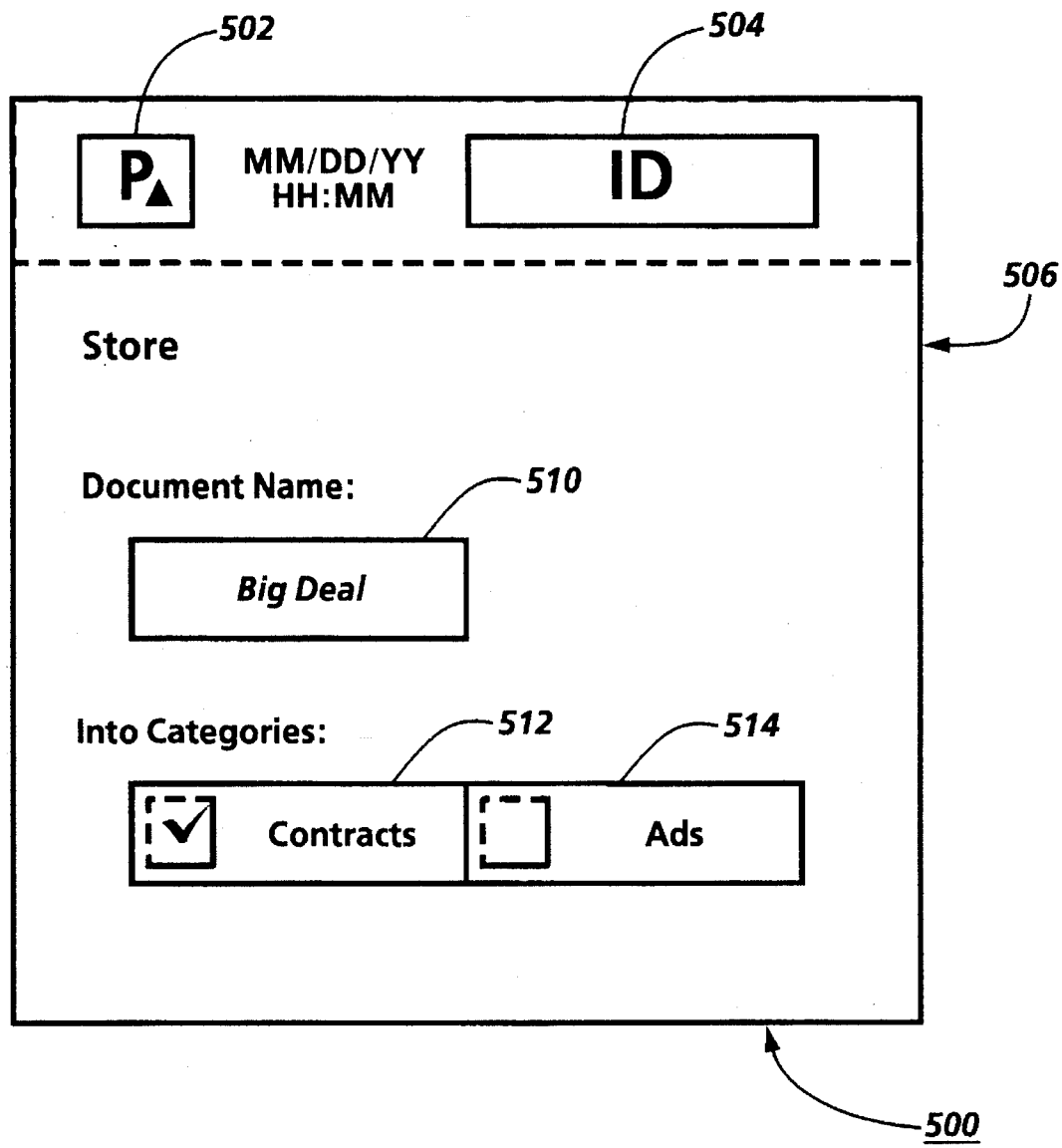
FIG. 7 is a schematic diagram showing a form that includes a document identifier field.
Figure 8:
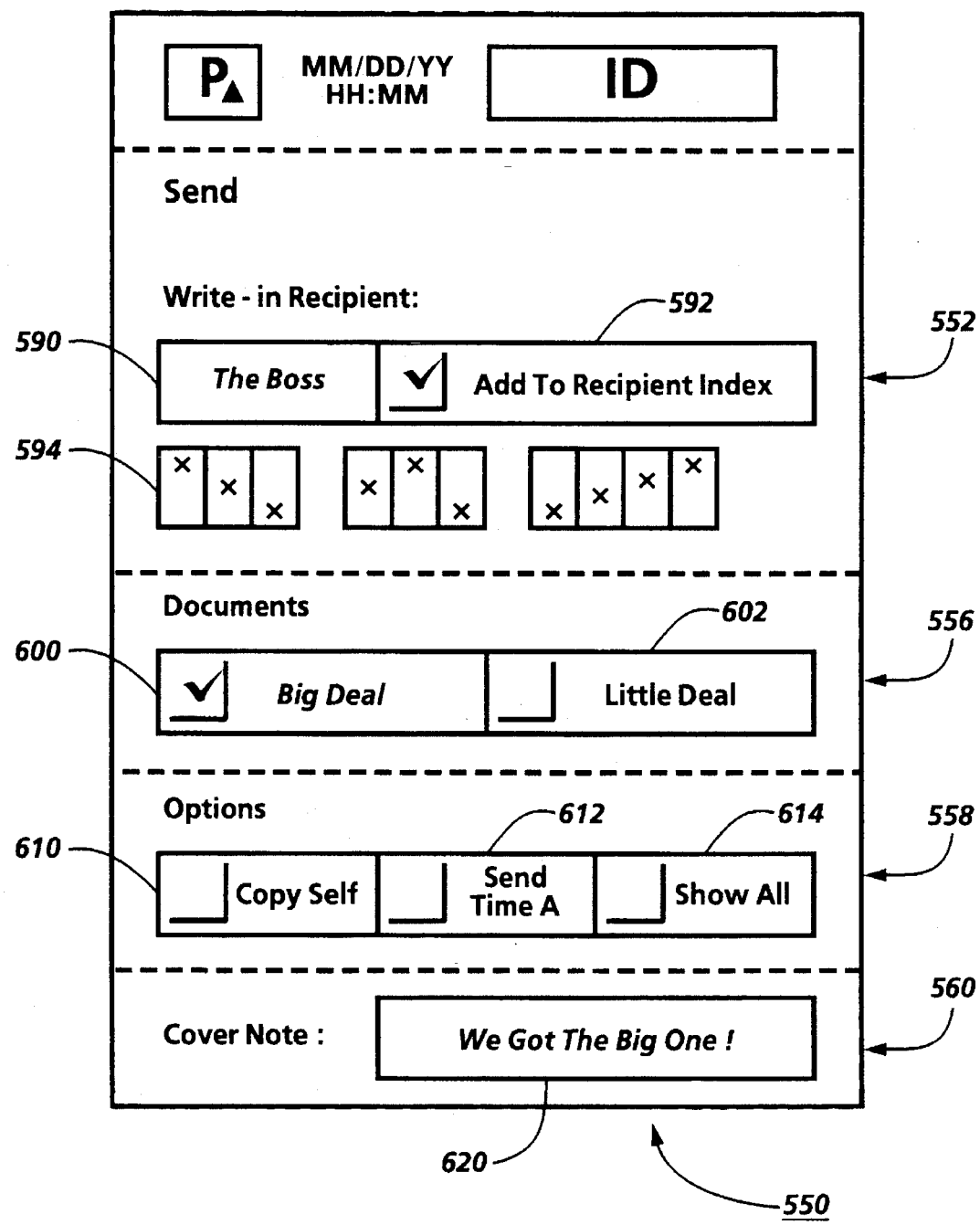
FIG. 8 is a schematic diagram showing an automatically created form that includes a version of an image of the document identifier field in the form in FIG. 7.
Figure 9:
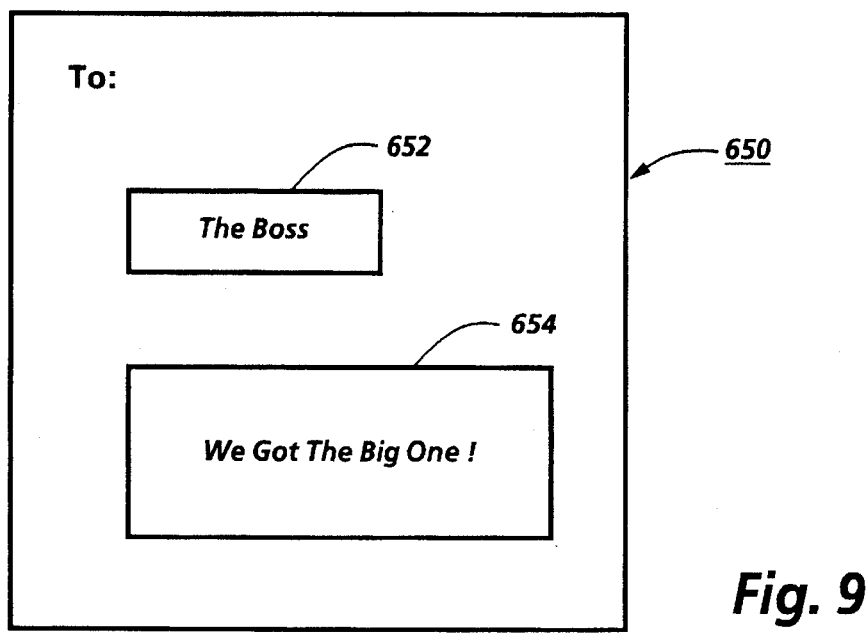
FIG. 9 is a schematic diagram showing an automatically created cover sheet that includes a version of an image of the recipient identifier field and the cover sheet field in the form in FIG. 8.
Figure 10:
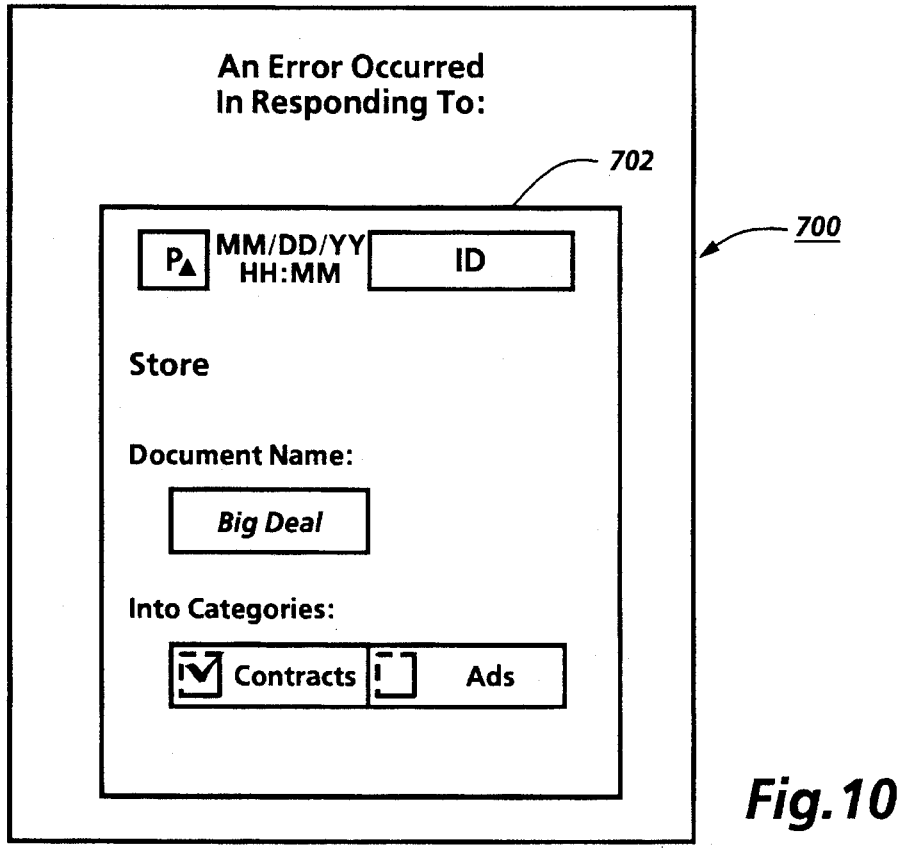
FIG. 10 is a schematic diagram showing an automatically created error sheet that includes a reduced version of an image of the form in FIG. 7.

FIGS. 7–10 illustrate how the general fax server features described above can be used to implement the invention. FIG. 7 shows a form with a document identifier field that a user has marked. FIG. 8 shows an automatically created form with a field that includes an image of the document identifier field from FIG. 7; FIG. 8 also shows a recipient identifier field and a cover note field that a user has marked. FIG. 9 shows an automatically created cover sheet that includes images of the cover note field and the recipient identifier field in FIG. 8. FIG. 10 shows an error sheet that includes a reduced version of an image of the form in FIG. 7.

Form 500 in FIG. 7 can be created in advance by a user through a form editor user interface provided by windows instructions 304. The form editor can allow the user to create a form with one or more sections, each for requesting a respective type of transaction, such as Send, Retrieve, Store, List Contents, and Delete. Also, form 500 could be an automatically created form obtained as described in copending coassigned U.S. patent application Ser. No. 07854,520, issued as U.S. Pat. No. 5,267,303, entitled "Using a Form to Request Automatic Form Creation," incorporated herein by reference. Documentation provided with software product 60 can explain to the user how to obtain a form like form 500.

Form 500, like other forms in the current implementation, includes logo 502 for use in registration and to determine that it is a form. Form 500 also includes machine readable form identifying information, illustratively in a distinct field 504. The form identifying information could be encoded in the manner described in copending coassigned U.S. patent application Ser. Nos. 07/560,514, now continued as 07/931,554, which is now continued as 08/240,798 entitled "Self-clocking Glyph Shape Codes," incorporated herein by reference. Each form shown has its own unique identifying information, and this information can be generated at the time the form is created, based on a function of an identifier of the software installation that creates the form. In addition to the fields shown, each form can also have human readable name, date and time of creation, and other information.

Form 500 also includes store request segment 506. This segment allows a user to request storage of a document and creation of an entry for the document in one or more of the categories in information database 322. In the user interface metaphor of the current implementation, information database 322 includes a hierarchy, with the leaf nodes being items of data relating to specific recipients, documents, and forms and with the parent nodes being containers. Information database 322 includes two top level containers: One, the "recipient index," contains containers called distribution lists. The other, called the "document index," contains containers called categories.

Each distribution list and category holds leaf nodes. Each distribution list contains one or more recipient entries, each including data indicating a transmission path to a recipient. Each category contains one or more pointers; each pointer indicates either a DOS file that contains a document or a DOS file that contains a form definition.

The recipient index always contains a distribution list called "All Recipients," which contains data for every registered recipient. The document index always contains categories called "All Documents," "All Forms," and "Help Documents," which respectively contain a pointer for every stored document other than help documents, for every stored form definition, and for every stored help document. In addition, the user can request creation of additional distribution lists and categories.

Store request segment 506, an example of a Store section, includes field 510, a rectangular outline adjacent the words Document Name." A user can write or otherwise mark a name or other identifying mnemonic of a document being stored in field 510.

Store request segment 506 also includes fields 512 and 514, each with a check box and additional information indicating the effect of checking the box. In any case, an entry will be created only in the special category "All Categories," but an entry will also be created in the category "Contracts" if field 512 is marked and in the category "Ads" if field 514 is marked.

The check boxes in segment 506 and in other sections discussed below can be implemented for detection as described in Copending coassigned U.S. patent application Ser. No. 07/855,984 entitled "Mark Sensing on a Form," incorporated herein by reference.

Form 500 could be a page within a facsimile transmission of an image set that includes other forms. One of the forms following form 500 could include a List Contents section as described in copending coassigned U.S. patent application Ser. No. 07/854,520, now issued as U.S. Pat. No. 5,276,303, entitled "Using a Form to Request Automatic Form Creation," incorporated herein by reference. Form 550 in FIG. 8 could be automatically created and transmitted to a destination indicated in the image set in response to the List Contents section. The destination could be indicated by a return address segment in the List Contents section or by data within the facsimile transmission that identifies the telephone number of the transmitting fax machine.

When the fax server receives a facsimile transmission of an image set that includes an image of form 500 followed by an image of a form with a List Contents section, it sets up actions as described above. The Batch action creates the Job Set action and the Job Set action creates Form actions, one for each of the forms in the batch.

The Form action for form 500 begins by obtaining the definition of form 500 from database 322. The definition in this case indicates that form 500 includes a Store section and also indicates information about fields 510, 512, and 514 within store request segment 506.

The Form action for form 500 can call image processing instructions 314 to obtain data defining an image of field 510. This data can be obtained by techniques that lift field 510 out of an image of form 500. Registration techniques can be used similar to those described in copending coassigned U.S. patent application Ser. No. 07/855,984 entitled "Mark Sensing on a Form," incorporated herein by reference. This data can be saved for subsequent use by a Store action. The Form action can also call image processing instructions 314 to determine whether the check boxes in fields 512 and 514 are marked.

The Form action for form 500 then creates a Store action, and the Store action sets up the necessary entries in information database 322 for subsequent use. The manner in which the Store action handles the data defining an image of field 510 is described above.

The Job Set action also creates a Form action for the form that includes the List Contents section. The Form action can similarly obtain the definition of the form and can call image processing instructions 314 to determine that the List Contents section requests a listing of the special category "All Documents" or of the category "Contracts" into a Send section in a form. If the List Contents section includes a return address segment, the Form action also obtains data indicating a transmission path as indicated in the return address segment.

The Form action automatically creates form 550, listing the contents of the indicated category in a Send section. Then the Form action creates a Pre-Retrieve action to transmit form 550. The Pre-Retrieve action converts form 550 to the appropriate format for the fax card, and then creates a Retrieve action to request a facsimile transmission.

The Retrieve action, as described above, obtains data indicating a transmission path. The Retrieve action can use the transmission path from the return address segment, if any, or, if none, the Retrieve action can use the received facsimile transmission to obtain data indicating the telephone number of the fax machine that sent the form. As described above, the Retrieve action submits a request for a facsimile transmission to TSR 310 and creates a Verify action to check for success.

Form 550 includes a send request segment, referred to as a Send section in the current implementation. The Send section includes new recipient segment 552, document segment 556, options segment 558, and cover note segment 560.

New recipient segment 552 includes fields for requesting transmission to a specified recipient. Field 590 has a rectangular outline within which a user can write a name or other identifying mnemonic of the recipient. Field 592 includes a check box that can be checked to request that the recipient be added to the recipient index in information database 322. In form 550, a user has written the words "The Boss" in field 590 and has marked the check box in field 592.

Field 594 includes boxes that a user has checked to indicate the telephone number of the recipient's fax machine. When the recipient is added to the recipient index, this telephone number can subsequently be dialed in response to a single check box in subsequently created send forms in the manner described in copending coassigned U.S. patent application Ser. No. 07/856,107, now issued as U.S. Pat. No. 5,282,052, entitled "Techniques for Automatic Form Creation by Combining Partial Operations," incorporated herein by reference. Field 594 can also include instructions and a small-scale example.

Document segment 556 includes fields 600 and 602, each including an identifier of a document and a check box that can be checked to indicate the document. As can be seen from field 600 and from field 510 in FIG. 7, the identifier of a document can be a version of an image from a form, in this case an image of a field. More generally, a form or other sheet can include a listing of items, each item's entry on the listing sheet including an identifier that is a version of an image from a form. Form 550 could be one example of such a listing sheet; another example is described in copending coassigned U.S. patent application Ser. No. 07/854,520, now issued as U.S. Pat. No. 5,267,303, entitled "Using a Form to Request Automatic Form Creation," incorporated herein by reference, in relation to a specially created listing sheet that that lists all recipients in a distribution list in response to a request for a Retrieve action.

The check boxes can be implemented for detection as described above. The user can check the boxes in fields 600 and 602 to request facsimile transmission of document "Big Deal" and document "Little Deal," respectively.

Options segment 558 similarly includes a set of fields, each including a box that can be checked to indicate an optional operation. For example, a user can check the box in field 610 to request a copy of a transmitted document also be saved in the user's in basket at the fax server; the box in field 612 to request that the transmission be done at a specified time, such as during the night when telephone rates are lower; or the box in field 614 to request automatic creation of a cover sheet for the transmission showing all recipients.

Cover note segment 560 includes field 620 with a rectangular outline, permitting a user to write a cover note for the cover sheet for the requested transmission. If, in response to a form action, image processing instructions 314 detect marks in field 620, a cover sheet is automatically created. In this case, a user has marked cover note field 620 with the words "We got the big one!"

During the Form action that creates form 550, the fax server produces an identifier of form 550 and creates a definition of form 550. The identifier is used to produce the machine readable form identifying information and is also included in a list of forms in information database 322. The form definition is also stored in information database 322 such that the identifier can be used to obtain its definition.

The form definition could be implemented in many ways. In the current implementation, the form definition indicates the types and positions of segments on the form. The current implementation provides for several types of segments for requesting operations, referred to as Send sections, Retrieve sections, List Contents sections, Delete sections, and Store sections.

A user-created form can include more than one section, but the current implementation allows only one of these section on an automatically created form.

Each type of segment has a respective set of smaller segments, and the form description also indicates the type, location, size, and contents of each smaller segment. Each smaller segment can, in turn, contain a set of still smaller segments, and the form description indicates each smaller segment's type, location, size, and contents. The types of a segment and of its smaller segments are also used by the Form action in determining how to retrieve and operate on its contents.

When the fax server receives a facsimile transmission of an image set that includes an image of form 550, it sets up actions as described above. The Batch action creates the Job Set action and the Job Set action creates a Form action for form 550. The Form action obtains the definition of form 550 from database 322. The definition in this case indicates that form 550 includes a send request segment and also indicates information about fields 590, 592, 594, 600, 602, 610, 612, 614, and 620.

The Form action can then call image processing instructions 314 to obtain data defining images of field 590 and 620. As noted above, this data can be obtained by clipping techniques and can be saved for subsequent use. The Form action can also call image processing instructions 314 to determine whether the check boxes in fields 592, 594, 600, 602, 610, 612, and 614 are marked.

Because the check box in field 592 is marked, the Form action adds an entry to information database 322 for the new recipient. As with field 510 in FIG. 7, data defining the image of field 590 can be included in the entry, as well as the transmission path indicated in field 594.

If image processing instructions 314 determine that field 620 has not been marked, a cover sheet may not be automatically created. This determination can be made;by determining whether field 620 includes more black pixels than a threshold, for example. A user may, however, obtain a cover sheet by marking the check box in field 614 or by setting up a user profile at installation so that a cover sheet is automatically created for every facsimile transmission.

If appropriate, the Form action automatically creates a cover sheet and stores it in a temporary DOS file. Then, the Form action creates a Pre-Send action as described above to transmit the new cover sheet and the document "Big Deal" to the new recipient via the transmission path indicated in field 594.

Cover sheet 650 in FIG. 9 could be automatically created by a Form action in response to form 550 in FIG. 8. Cover sheet 650 includes segment 652, a version of an image of field 590 in form 550. Cover sheet 650 also includes segment 654, a version of an image of cover note field 620 in form 550. Creation of cover sheet 650 can be similar to creation of a form as described above, except that it is not necessary to save a definition. Cover sheet 650 can be transmitted to the destination indicated in field 594, as noted above.

Automatic cover sheet creation could be performed by actions other than the Form action. For example, the Send action and the Retrieve action could create cover sheets.

In addition to the information shown on cover sheet 650, an automatically created cover sheet could include the telephone number of the recipient, the name of the sender, the title of a transmitted document, the total page count, the date and time, and so forth. If the check box in field 614 is marked, the cover sheet can include identifiers of all recipients of the transmission.

Error sheet 700 in FIG. 10 could be automatically created by a Form action if a failure occurs in responding to form 500 in FIG. 7. As shown, error sheet 700 simply includes text indicating an error occurred and segment 702, a reduced version of form 500, from which a user can determine whether the error resulted from a problem with the form. The Form action can create a Pre-Retrieve action to transmit error sheet 700 to an image destination indicated in a return address segment, if any, or to the fax machine from which the form was received.

An error sheet like that in FIG. 10 could be created in many situations. For example, if the form includes a security code segment and an incorrect security code is marked, an error sheet could be sent. Similarly, an error message could be sent if the form is obsolete.

The image of a form can be reduced by techniques like those described in copending coassigned U.S. patent application Ser. No. 07/449,627, now continued as Ser. No. 08/010,825 entitled "Image Reduction/Enlargement Techniques," incorporated herein by reference. The ratio of reduction should be great enough to allow room on the error sheet for the reduced form but not so great that a user cannot obtain information from the resulting image. For example, 50% reduction may be satisfactory.

D. Applications

The invention could be applied in many other ways other than in a system that performs facsimile transmissions. In general, the invention could be applied to any system in which images of forms can be transmitted, such as a system that includes a scanner and a printer.

E. Miscellaneous

The invention has been described mainly in relation to implementations in which a machine responds to a form received by facsimile transmission. The invention might also be implemented in various other environments. The invention is not limited to forms related to fax machines, although it is especially useful for such forms.

The invention has been described mainly in relation to implementations that automatically create forms, cover sheets, and error sheets and transmit them. The invention might also be implemented to automatically create other types of pages that can convey useful information with a version of an image from a form.

The invention has been described mainly in terms of paper pages. The invention might also be implemented with pages on media other than paper, and with pages that are not on sheets as such, but on other types of marking media. For example, the invention might be implemented with a page on a marking surface on which a user can make marks that are electronically scanned.

The invention has been described in relation to software implementations, but the invention might be implemented with specialized hardware.

The invention has been described in relation to a software product that can be run on a personal computer with a fax card to provide fax services. In addition to the specific personal computer described, the invention could be implemented on any other personal computer, workstation, fax machine, or other system with suitable processing capabilities. In addition to the specific fax cards described, the current implementation could be extended to support other fax cards that can run in the Microsoft Windows environment and that have a programmable interface. In addition, the invention could be implemented with any other fax card or similar device for receiving and transmitting images, provided it has suitable processing capabilities. The invention could also be implemented in a dedicated server that provides fax services.

The invention has been described in relation to an implementation that also includes a user interface with a display and user input device such as a keyboard with a mouse. The user interface could be used to edit an automatically created form or to personalize a user profile to provide parameters used during automatic page creation. For example, a user could personalize the profile to indicate how fields appear within the segments of an automatically created page.

The invention has been described in relation to implementations in which a page is automatically created that includes a version of an image from a form. The invention might also be implemented to create a page that includes versions of images from each of a number of forms. The page need not be automatically created in response to a request on the same form that includes the image-the image could be taken from a first form and a second form could then request the operation that includes automatic page creation.

The invention has been described in relation to fields that are rectangular or two-sided, but any other appropriate type of marking field could be defined on a form, including a field defined by parentheses, a field defined by shading, and a field of any appropriate shape.

The invention has been described in relation to implementations in which an image from a form is used in automatic creation of a page. In addition to its use in automatic creation of a page, data defining the image could be stored in memory and used for subsequent operations, including operations requested through a graphical user interface.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed:

1. A method of operating a system that includes:

image input circuitry for obtaining data defining images as input;

image output circuitry for providing data defining images as output; and a processor connected for receiving data defining images from the image input circuitry and for providing data defining images to the image output circuitry;

the method comprising:

operating the processor to receive input image data from the image input circuitry; the input image data defining a first image set that shows a first form that has been marked; the input image data further including destination information indicating an image destination; and in response to the input image data, operating the processor to use the input image data to automatically produce created page data and to provide the created page data to the image output circuitry for transmission to the image destination; the created page data defining a second image set that shows a page, the page including a segment that is a version of an image from the first form.

2. The method of claim 1 in which the image output circuitry is connected to provide a facsimile transmission; the system further including memory storing data, the stored data including path data indicating a transmission path to a first recipient; the destination information including a recipient field in the first form, the recipient field being marked to indicate a recipient set to whom facsimile transmission is requested, the recipient set including the first recipient; the act of operating the processor to use the input image data comprising:

using the input image data to obtain recipient data indicating the recipient set to whom facsimile transmission is requested in the recipient field;

using the recipient data to obtain the path data; and using the path data to transmit the created page data to the first recipient.

3. The method of claim 1 in which the page is a form.

4. The method of claim 1 in which the page is a cover sheet.

5. The method of claim 1 in which the page is a listing sheet.

6. The method of claim 1 in which the first form includes an image mark field that is marked; the image from the first form showing the contents of the image mark field.

7. The method of claim 6 in which the image mark field is an identifier field; the page being a form having a request field for indicating a request; the act of operating the processor to use the input image data comprising:

using the input image data to obtain segment data defining an image of the identifier field; and using the segment data to obtain the created page data so that the second image set shows an image of the identifier field within the request field.

8. The method of claim 7 in which the request field is for indicating a request for facsimile transmission to a recipient; the image of the identifier field identifying the recipient.

9. The method of claim 7 in which the request field is for indicating a request for facsimile transmission of a document; the image of the identifier field identifying the document.

10. A system comprising:

image input circuitry for obtaining data defining images as input;

image output circuitry for providing data defining images as output;

memory storing data; and a processor connected for receiving data defining images from the image input circuitry and for providing data defining images to the image output circuitry; the processor further being connected for accessing the data stored in memory;

the data stored in the memory comprising:

image receiving instruction data indicating input instructions the processor can execute to receive input image data from the image input circuitry; the input image data defining an image set; and operation performing instruction data indicating response instructions the processor can execute to perform operations in response to input image data;

when the input image data define a first image set that shows a first form that has been marked and further include destination information indicating an image destination, execution of the response instructions causing the processor to use the input image data to automatically produce created page data and to provide the created page data to the image output circuitry for transmission to the image destination; the created page data defining a second image set that shows a page, the page including a segment that is a version of an image from the first form.

11. The system of claim 10 in which the input image circuitry is connected for receiving facsimile transmissions.

12. The system of claim 10 in which the output image circuitry is connected for providing facsimile transmissions.

13. An article of manufacture for use in a system that includes:

image input circuitry for obtaining data defining images as input;

image output circuitry for providing data defining images as output;

a storage medium access device for accessing a medium that stores data; and a processor connected for receiving data defining images from the image input circuitry and for providing data defining images to the image output circuitry; the processor further being connected for receiving data from the storage medium access device;

the article comprising:

a data storage medium that can be accessed by the storage medium access device when the article is used in the system; and data stored by the data storage medium so that the storage medium access device can provide the stored data to the processor when the article is used in the system; the stored data comprising:

image receiving instruction data indicating input instructions the processor can execute to receive input image data from the image input circuitry; the input image data defining an image set; and operation performing instruction data indicating response instructions the processor can execute to perform operations in response to input image data;

when the input image data define a first image set that shows a first form that has been marked and further include destination information indicating an image destination, execution of the response instructions causing the processor to use the input image data to automatically produce created page data and to provide the created page data to the image output circuitry for transmission to the image destination; the created page data defining a second image set that shows a page, the page including a segment that is a version of an image from the first form.

14. A method of operating a system that includes:

image input circuitry for obtaining data defining images as input;

image output circuitry for providing data defining images as output; and a processor connected for receiving data defining images from the image input circuitry and for providing data defining images to the image output circuitry;

the method comprising:

operating the processor to receive input image data from the image input circuitry; the input image data defining a first image set that shows a first form with first and second fields that have been marked by a user; the second field being marked to indicate an image destination; and in response to the input image data, operating the processor to use the input image data to automatically produce created page data and destination data and to provide the created page data and the destination data to the image output circuitry; the created page data defining a second image set that shows a page, the page including a segment that is a version of an image from the first form, the segment :showing the first field; the destination data indicating the image destination indicated by the second field; and operating the image output circuitry to use the destination data to transmit the created page data to the image destination.

15. A method of operating a system that includes:

image input circuitry for obtaining data defining images as input;

image output circuitry for providing data defining images as output; and a processor connected for receiving data defining images from the image input circuitry and for providing data defining images to the image output circuitry;

the method comprising:

operating the processor to receive input image data from the image input circuitry; the input image data defining a first image set that shows a first form with a first field and a second form with a second field, the first and second fields each having been marked by a user; the second field being marked to indicate an image destination; and in response to the input image data, operating the processor to use the input image data to automatically produce created page data and destination data and to provide the created page data and the destination data to the image output circuitry; the created page data defining a second image set that shows a page, the page including a segment that is a version Of an image from the first form, the segment showing the first field; the destination data indicating the image destination indicated by the second field; and operating the image output circuitry to use the destination data to transmit the created page data to the image destination.

16. A method of operating a system that includes:

image input circuitry for obtaining data defining images as input; the image input circuitry being connected to receive a facsimile transmission;

image output circuitry for providing data defining images as output; the image output circuitry being connected to provide a facsimile transmission; and a processor connected for receiving data defining images from the image input circuitry and for providing data defining images to the image output circuitry;

the method comprising:

operating the processor to receive input image data from a fax machine through the image input circuitry; the input image data defining a first image set that shows a first form with a field that has been marked by a user; the first form indicating a request for an operation; the input image data further including telephone number data indicating a telephone number of the fax machine, the telephone number data not being part of the first form;

in response to the input image data, operating the processor to use the input image data to obtain data indicating the requested operation;

if an error occurs in performing the requested operation, operating the processor to use the input image data to automatically produce created error sheet data and destination data and to provide the created error sheet data and the destination data to the image output circuitry; the created error sheet data defining a second image set that shows an error sheet, the error sheet including a segment that is a version of an image of the first form including the field that has been marked; the destination data indicating the telephone number of the fax machine; and operating the image output circuitry to use the destination data to transmit the created error sheet data to the fax machine.

17. The method of claim 16 in which the segment is a reduced version of the image of the first form; the act of operating the processor to use the input image data comprising using the input image data to obtain segment data defining the segment.

18. A method of operating a system that includes:

image input circuitry for obtaining data defining images as input;

image output circuitry for providing data defining images as output; and a processor connected for receiving data defining images from the image input circuitry and for providing data defining images to the image output circuitry;

the method comprising:

operating the processor to receive input image data from the image input circuitry; the input image data defining a first image set that shows a first form with an identifier field that has been marked by a user to provide an identifier; the input image data further including destination information indicating an image destination;

in response to the input image data, operating the processor to use the input image data to automatically produce created form data and to provide the created form data and destination data to the image output circuitry; the created form data defining a second image set,that shows a second form, the second form including a request field for indicating a request; the request field including an image of the identifier field from the first form; the destination data indicating the image destination; and operating the image output circuitry to use the destination data to transmit the created form data to the image destination.

19. The method of claim 18 in which the image output circuitry is connected to provide a facsimile transmission; the destination information including a telephone number field in the first form, the telephone number field being marked to indicate a telephone number of a fax machine; the act of operating the processor to use the input image data comprising:

using the input image data to obtain telephone number data indicating the telephone number indicated in the telephone number field; the destination data including the telephone number data;

the act of operating the image output circuitry comprising: using the telephone number data to transmit the created form data to the fax machine.

20. The method of claim 18 in which the image output circuitry is connected to provide a facsimile transmission; the first image set showing a second form that has been marked; the destination information including a telephone number field in the second form, the telephone number field being marked to indicate a telephone number of a fax machine; the act of operating the processor to use the input image data comprising:

using the input image data to obtain telephone number data indicating the telephone number indicated in the telephone number field; the destination data including the telephone number data;

the act of operating the image output circuitry comprising: using the telephone number data to transmit the created form data to the fax machine.

21. The method of claim 18 in which the image input circuitry is connected to receive a facsimile transmission and the image output circuitry is connected to provide a facsimile transmission; the input image data being received by the image input circuitry from a fax machine, the destination information including telephone number data indicating a telephone number of the fax machine, the telephone number data not being part of the first form; the destination data including the telephone number data; the act of operating the image output circuitry comprising:

using the telephone number data to transmit the created form data to the fax machine.

22. A method of operating a system that includes:

image input circuitry for obtaining data defining images as input;

image output circuitry for providing data defining images as output; and a processor connected for receiving data defining images from the image input circuitry and for providing data defining images to the image output circuitry;

the method comprising:

operating the processor to receive input image data from the image input circuitry; the input image data defining a first image set that shows a first form with first and second fields that have been marked by a user; the input image data further including destination information indicating an image destination;

in response to the input image data, operating the processor to use the input image data to automatically produce created page data and destination data and to provide the created page data and the destination data to the image output circuitry; the created page data defining a second image set that shows a page; the page including a first segment that is a version of a first image from the first form, the first segment showing the first field; the page including a second segment that is a version of a second image from the first form, the second segment showing the second field; the destination data indicating the image destination; and operating the image output circuitry to use the destination data to transmit the created page data to the image destination.

23. The method of claim 22 in which the first field is a note field; the act of operating the processor to use the input image data comprising:

using the input image data to determine that the first field is marked;

using the input image data to obtain segment data defining an image of the first field; and using the segment data to obtain the created page data so that the second image set shows an image of the first field within the page.

24. The method of claim 22 which the first field is an identifier field; the page being a cover sheet; the act of operating the processor to use the input image data comprising:

using the input image data to obtain segment data defining an image of the identifier field; and using the segment data to obtain the created page data so that the second image set shows an image of the identifier field within the page.

25. The method of claim 22 in which the image output circuitry is connected to provide a facsimile transmission; the destination information including a telephone number field in the first form, the telephone number field being marked to indicate a telephone number of a fax machine; the act of operating the processor to use the input image data comprising:

using the input image data to obtain telephone number data indicating the telephone number indicated in the telephone number field; the destination data including the telephone number data;

the act of operating the image output circuitry comprising: using the telephone number data to transmit the created page data to the fax machine.

26. The method of claim 22 in which the image output circuitry is connected to provide a facsimile transmission; the first image set showing a second form that has been marked; the destination information including a telephone number field in the second form, the telephone number field being marked to indicate a telephone number of a fax machine; the act of operating the processor to use the input image data comprising:

using the input image data to obtain telephone number data indicating the telephone number indicated in the telephone number field; the destination data including the telephone number data;

the act of operating the image output circuitry comprising:
using the telephone number data to transmit the created page data to the fax machine.

27. The method of claim 22 in which the image input circuitry is connected to receive a facsimile transmission and the image output circuitry is connected to provide a facsimile transmission; the input image data being received by the image input circuitry from a fax machine, the destination information including telephone number data indicating a telephone number of the fax machine, the telephone number data not being part of the first form; the destination data including the telephone number data; the act of operating the image output circuitry comprising:

using the telephone number data to transmit the created page data to the fax machine.

28. The method of claim 22 in which the image output circuitry is connected to provide a facsimile transmission the system further including memory storing data, the stored data including path data indicating a transmission path to a first recipient; the destination information including a recipient field in the first form, the recipient field being marked to indicate a recipient set to whom facsimile transmission is requested, the recipient set including the first recipient; the act of operating the processor to use the input image data comprising:

using the input image data to obtain recipient data indicating the recipient set to whom facsimile transmission is requested in the recipient field; and using the recipient data to obtain the path data; the destination data including the path data;

the act of operating the image output circuitry comprising:
using the path data to transmit the created page data to the first recipient.

* * * * *